United States Patent [19]

Goto et al.

[11] Patent Number: 5,000,299

[45] Date of Patent: Mar. 19, 1991

[54] SHOCK ABSORBER USING ELECTRO-VISCOUS FLUID

[75] Inventors: Katsuhiro Goto, Komaki; Akiyoshi Ide, Inuyama; Kohichi Hasegawa; Masaaki Takizawa, both of Mishima, all of Japan

[73] Assignee: Tokai Rubber Industries, Ltd., Aichi, Japan

[21] Appl. No.: 472,793

[22] Filed: Jan. 31, 1990

[30] Foreign Application Priority Data

Feb. 7, 1989 [JP] Japan .................................. 1-28408
Feb. 7, 1989 [JP] Japan .................................. 1-28409

[51] Int. Cl.⁵ ........................ F16F 15/03; F16M 5/00
[52] U.S. Cl. .................................. 188/267; 188/312; 267/140.1
[58] Field of Search .............. 188/267, 312, 274, 320, 188/315; 267/140.1 R, 140.1 AE, 140.1 E; 180/300, 312

[56] References Cited

U.S. PATENT DOCUMENTS 2,576,658 11/1951 Werner ................................ 188/274
2,956,647 10/1960 Bartholomaus ..................... 188/274

FOREIGN PATENT DOCUMENTS 0132404 1/1985 European Pat. Off. .
0261427 8/1987 European Pat. Off. .
0342882 11/1989 European Pat. Off. .
7603075 9/1977 Netherlands ....................... 188/312
1282568 6/1972 United Kingdom .

Primary Examiner—Robert J. Oberleitner
Attorney, Agent, or Firm—Oliff & Berridge

[57] ABSTRACT

A shock absorber including a main housing body having a cylindrical portion and closure portions closing the open ends of the cylindrical portion, an inner cylindrical member disposed within the main body and cooperating therewith to define an inner cylinder chamber and an outer annular space, and a piston slidably received within the cylinder chamber, so as to divide the cylinder chamber into two fluid chambers filled with an electro-viscous fluid. The fluid chambers communicate with each other through communication passage which includes a portion formed within the annular space. An operating and a balancing rod are secured to the piston and extend slidably through the respective two closure portions of the main body. The shock absorber includes at least one pair of electrodes one of which consists of a portion of the cylindrical portion of the main body and the other of which consists of a portion of the inner cylindrical portion. The electrodes are disposed so as to define at least a portion of the communication passage, for applying a voltage to the fluid in that portion of the passage.

12 Claims, 4 Drawing Sheets

SHOCK ABSORBER USING ELECTRO-VISCOUS FLUID

BACKGROUND OF THE INVENTION

1. Field of the Invention

The present invention relates in general to a shock absorber for damping vibrations, and more particularly to a shock absorber used on a automotive vehicle, in combination with vibration-isolating elastic mounts device, for suitably preventing an excessive amount of oscillation or shake of an engine of the vehicle.

2. Discussion of the Prior Art

In a motor vehicle, vibration-isolating elastic mounts such as rubber mounts are generally used to elastically support an engine on the body of the vehicle, for preventing the transmission of vibrations of the engine from to the vehicle body, which deteriorates the driving comfort of the vehicle. The vibration isolating capability of the elastic mounts increases with an increase in the elasticity of the mounts. In other words, the vibrations are effectively isolated when the mounts exhibit relatively soft spring characteristics. Accordingly, as far as the vibration isolating capability of the elastic mounts with respect to the vehicle body is concerned, it is desirable that the spring characteristics of the elastic mounts are as soft as possible. However, the soft spring characteristics of the vibration-isolating elastic mounts tend to cause the engine to be easily oscillated, resulting in an excessive amount of shake of the engine upon rapid starting, abrupt of full braking, sharp turning or bumpy-road running of the vehicle. Thus, the highly elastic mounts are undesirable in terms of the driving stability and comfort of the vehicle.

To minimize such excessive oscillation or shaking of the engine or the motor vehicle upon rapid starting or abrupt braking or under other conditions of the vehicle, a shock absorber is often used in combination with the vibration-isolating elastic mounts, in particular on a front-engine front-drive vehicle (FF car) in which the above tendency is considerably high.

As a shock absorber as indicated above for preventing the engine shake of the vehicle, a fluid-filled damper adapted to provide a damping effect utilizing a resistance of an orifice to a flow of a fluid therethrough is commonly used, since the desired damping characteristics of the fluid-filled damper may be selected over a wide range of operating conditions. In this type of known fluid-filled shock absorber, however, a relatively complicated mechanism is required to change the configuration of the orifice for obtaining the desired damping characteristics. Accordingly, the known fluid-filled shock absorber is considerably complicated in construction. In view of this problem, the conventionally used shock absorber for damping the engine shake of the motor vehicles does not have the mechanism for changing the damping characteristics. Namely, the damping characteristics of the shock absorber are fixed. If the shock absorber having the fixed damping characteristics is used as the damping device for preventing the engine shake on the vehicle, the following drawbacks will be encountered.

If the shock absorber is adapted to provide a sufficiently high damping effect for suitably preventing or damping an excessive amount of oscillation or shaking of the engine upon rapid starting, abrupt braking, sharp turning or bumpy-road running of the vehicle, the shock absorber is excessively stiff, supporting the engine too rigidly to suitably isolate the vibrations which are generated during idling or normal cruising of the vehicle. That is, the excellent damping characteristics for the engine shake are not favorable for isolating the idling and normal running vibrations of the vehicle, whereby the driving comfort is deteriorated. If the shock absorber is adapted to provide a relatively low damping effect for sufficiently elastically support the engine so as to suitably isolate the idling and normal running vibrations of the vehicle, on the other hand, the engine shake may not be effective damped, whereby the driving stability and comfort are deteriorated when the vehicle is rapidly or abruptly started or braked.

SUMMARY OF THE INVENTION

It is therefore an object of the present invention to provide a shock absorber suitable for preventing oscillation of an engine of an automative vehicle, which shock absorber is comparatively simple in construction and is capable of selectively exhibiting a relatively high or relatively low damping effect.

The above object may be achieved according to the principle of the present invention, which provides a shock absorber comprising: (a) a main body including a cylindrical portion having opposite open ends, and closure wall portions fluid-tightly closing the open ends of the cylindrical portion; (b) an inner cylindrical member disposed within the main body, with a predetermined radial spacing from an inner circumferential surface of the cylindrical portion, and cooperating with the main body to define an inner cylinder chamber and an outer annular space; (c) a piston slidably received within the inner cylinder chamber, so as to divide the cylinder chamber into two fluid chambers; (d) means for defining at least one communication passage for fluid communication between the two fluid chambers, the communication passage means including a portion formed within the annular space; (e) an electro-viscous fluid filling the two chambers and the at least one communication passage; (f) an operating rod secured to the piston and slidably and fluid-tightly extending through one of the two closure wall portions of the main body; (g) a balancing rod secured to the piston and slidably and fluid-tightly extending through the other of the two closure wall portions, the operating and balancing rods having a same cross sectional area; and (h) at least one pair of electrodes one of which consists of at least a portion of the cylindrical portion of the main body and the other of which consists of at least a portion of the inner cylindrical portion, the electrodes of each of the at least one pair being disposed opposite to each other, so as to define at least a portion of the at least one communication passage, for applying a voltage to a mass of the electro-viscous fluid in the portion of the at least one communication passage.

The term "electro-viscous fluid" used herein is interpreted to mean a fluid whose apparent viscosity substantially varies from the nominal viscosity, when the fluid is exposed to an external electric field. The viscosity of the electro-viscous fluid increases with an increase in the magnitude of the electric field. This electro-viscous fluid may be referred to as "electro-rheological fluid".

The shock absorber of the present invention described above is installed so that a vibrational load to be damped is applied between the main body and the operating rod. Upon application of the vibrational load between the main body and the operating rod, the piston to which the operating rod is secured is moved relative to the main body, whereby the electro-viscous fluid is forced to flow from one of the two chambers of the cylinder chamber to the other fluid chamber through the communication passage. At this time, the communication passage provide a resistance to flows of the electro-viscous fluid therethrough, whereby the pressures in the two fluid chambers are changed so as to prevent the piston from being moved in the cylinder chamber. The variation in the pressures in the fluid chambers causes a damping or braking force acting on the piston, thereby preventing a relative movement between the operating rod and the main body. Thus, the vibrational load applied between the operating rod and the main body is damped.

When a voltage is applied between the electrodes which define at least a portion of the communication passage, the viscosity of a mass of the electro-viscous fluid accommodated in that portion of the passage is increased to a substantial extent, whereby the overall fluid flow resistance of the communication passage is increased to increase the damping force acting on the piston, and thereby increase of braking force for preventing the relative movement of the operating rod and the main body. When the voltage is removed from the electrodes, on the other hand, the viscosity of the fluid mass accommodated between these electrodes is substantially lowered, whereby the damping force acting on the piston and the braking force for preventing the relative movement of the operating rod and the main body are reduced.

If the present shock absorber is used on a motor vehicle for preventing the engine oscillation or shake, the condition in which the engine is supported by the shock absorber can be changed depending upon the running condition of the vehicle, by applying or removing a voltage to or from the electrodes, or by changing the voltage level applied between the electrodes.

More specifically described, upon rapid starting or braking, sharp turning or bumpy-road running of the vehicle, the voltage is applied between the electrodes to enable the shock absorber to exhibit a relatively high damping effect or sufficient damping characteristics suitable for effectively preventing an excessive amount of shaking of the engine. When the engine is idling or the vehicle is normally cruising, the voltage is removed from the electrodes, or alternatively the applied voltage is lowered, to enable the shock absorber to exhibit a relatively low damping effect, so that the engine is relatively stiffly or rigidly supported by the shock absorber, for effectively isolate the engine idling or normal vehicle running vibrations.

It will be understood from the above description that the present shock absorber is adapted to normally provide a relatively high damping effect, and is provided with a function of reducing the damping effect when needed, by simply applying a voltage to the electrodes or lowering the applied voltage. Thus, the present shock absorber which merely requires a simple arrangement for controlling the voltage applied to the electrodes is effectively used as a device for damping the oscillation of a vehicle engine, or for other applications where the desired damping characteristics differ depending upon the operating condition of a subject on which the damping device is used.

As described above, the operating and balancing rods which extend from the piston in the opposite directions have the same cross sectional area, so that the volumetric change (increase) of one of the two fluid chambers is equal to the volumetric change (decrease) of the other fluid chamber.

In one form of the invention, the means for defining at least one communication passage includes an electrically insulating strip which is wound on the outer circumferential surface of the inner cylindrical member such that the turns of the strip are spaced apart from each other in the axial direction of the inner cylindrical member so that the turns of the strip cooperate with the outer circumferential surface of the innner cylindrical member to define a groove which is closed by the inner circumferential surface of the cylindrical portion of the main body, whereby a single communication passage is formed with a portion thereof passing through the annular space between the inner cylindrical member and the cylindrical portion of the main body. For example, the strip is helically wound on the inner cylindrical member, so that the communication passage has a helical shape within the annular space. This portion of the communication passage may suitably communicate with the two fluid chambers through holes formed through the inner cylindrical member.

In another form of the invention, at least a portion of the communication passage consists of a plurality of parallel lines each of which is at least partially defined by the electrodes. For example, the means for defining the communication passage includes a plurality of electrically insulating strips which are wound on the outer circumferential surface of the inner cylindrical member such that turns of each of the strips are spaced apart from each other, so that the turns of adjacent ones of the strips cooperate with the outer circumferential surface of the inner cylindrical member to define a plurality of grooves which are closed by the inner circumferential surface of the cylindrical portion of the main body, whereby a plurality of parallel lines corresponding to the grooves are formed with portions thereof passing through the annular space. For example, the plurality of strips are helically wound on the inner cylindrical member, so that each passage line has a helical shape within the annular space. This portion of each passage line may suitably communicate with the two fluid chambers through holes formed through the inner cylindrical member.

The above form of the invention wherein the parallel lines are at least partially defined by the at least one pair of electrodes is advantageous in the following respect:

The electrical conductivity of the electro-viscous fluid or electro-rheological fluid increases with the temperature. Accordingly, the amount of an electric current flowing through the fluid increases with the temperature, even if the fluid is exposed to a constant magnitude of the electric field, i.e., even if the voltage applied to the electrodes is constant. Therefore, the amount of current consumed by the fluid increases with the temperature, and the load applied to the power source for the electrodes is increased eventually to an overload level of the power source, whereby the power source and the related peripheral components are damaged or become defective. In the present shock absorber, therefore, it is desirable to minimize the total amount of current flowing through the electro-viscous fluid while maintaining a constant magnitude of the electric field in which the fluid is placed or a constant voltage applied to the electrodes is held constant, in order to avoid the problem indicated above and to minimize the required capacity of the power source.

For reducing the total amount of current applied to the electrodes while maintaining the constant electric field magnitude or electrode voltage, it is considered to reduce the surface area of the electrodes. However, the reduction in the electrode surface area inherently reduces the volume of the electro-viscous fluid which is exposed to the electric field, thereby reducing the overall flow resistance of the fluid in the communication passage, and consequently the damping force provided by the fluid flow resistance. In this sense, it is difficult to deal with the problem by simply reducing the surface area of the electrodes.

Another potential approach to solve the above-indicated problem is to increase the length of the communication passage and reduce the cross sectional area of the passage. This approach makes it possible to increase the overall flow resistance of the electro-viscous fluid and thereby increase the damping force while maintaining a constant voltage applied to the electrode (constant magnitude of the electric field) without reducing the surface area of the electrodes. Accordingly, the applied voltage or the surface area of the electrodes may be reduced to reduce the total amount of electric power applied to the fluid (amount of current consumed by the fluid), while the same damping force is provided based on the flow resistance of the fluid.

However, the reduction in the cross sectional area of the communication passage to solve the problem results in a considerable increase in the flow resistance of the electro-viscous fluid even while the fluid is not exposed to an electric field. For this reason, the cross sectional area of the communication passage cannot be reduced to a sufficient extent. In other words, there is a limitation in reducing the consumed current by reducing the cross sectional area of the communication passage to reduce the the voltage applied to the electrodes or the surface area of the electrodes.

According to the preferred form of the invention indicated above, at least a portion of the communication passage consists of a plurality of parallel lines each of which is at least partially defined by the electrodes, so that a voltage is applied to the mass of the fluid which flows through each passage line. If, the example, a communication passage consists of a plurality of parallel lines, the total area of the surfaces of the parallel lines which contact the fluid is effectively increased without reducing the total cross sectional area of the parallel lines. Therefore, the flow resistance of the electro-viscous fluid may be increased based on a frictional resistance produced by the fluid masses contacting the passage surfaces (surfaces defining the parallel lines), without reducing the total surface area of the parallel lines. An increase in the flow resistance of the fluid by using the parallel lines permits a corresponding amount of reduction in the applied voltage or surface area of the electrodes, which results in a decrease in the total amount of electric power applied to the fluid.

Thus, the shock absorber using the parallel lines for the communication passage as described above is capable of providing a relatively high damping effect with a relatively small amount of consumption of electric power for applying a voltage to the electrodes. The provision of the parallel lines is effective to avoid overloading of the power source and the resulting drawbacks, which would otherwise occur due to an increased amount of current applied to the fluid when the temperature of the fluid is relatively high.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
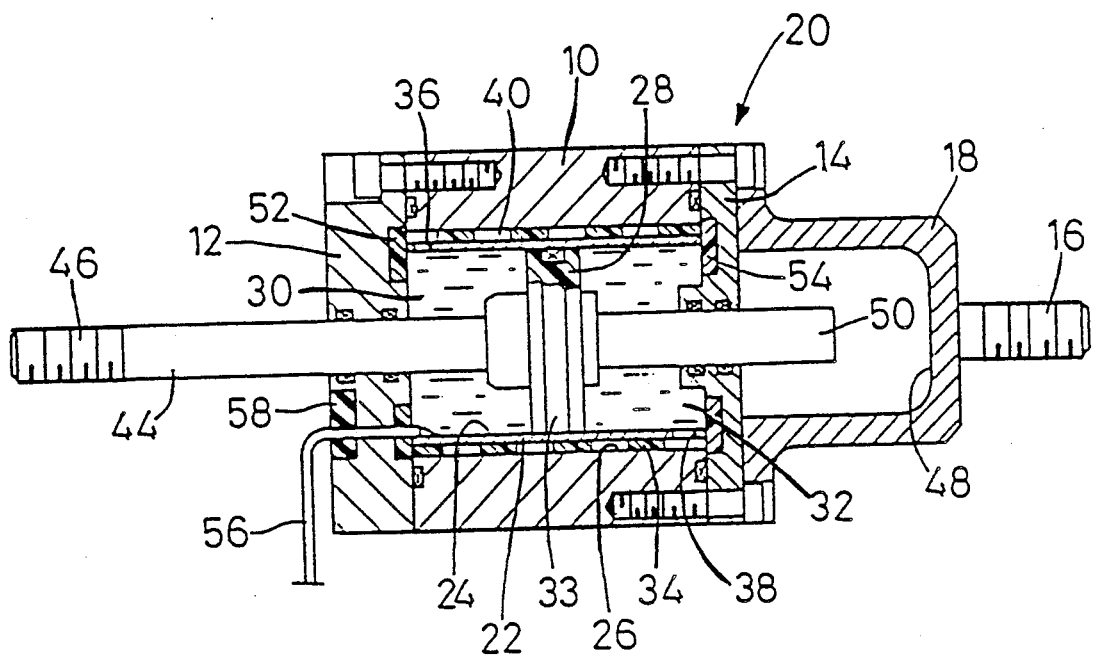
FIG. 1 is an elevational view in cross section of one embodiment of a shock absorber of the present invention.

Referring first to FIG. 1, the shock absorber shown therein is adapted to damp oscillation of an engine of a motor vehicle. In the figure, reference numeral 10 denotes a metallic, thick-walled cylindrical member, which serves as a cylindrical portion of a main body 20 of the shock absorber. The cylindrical member 10 has opposite open ends which are closed fluid-tightly by respective closure wall portions in the form of metallic, thick-walled discs 12, 14. The main body 20 has a metallic cup-shaped bracket 18 which is secured at its open end to an outer surface of the closure member 14. The bracket 18 has a fixing bolt 16 extending outwardly from the bottom wall thereof.

Within the cylindrical member 10 of the main body 20, there is disposed a metallic, thin-walled inner cylindrical member 22, such that the members 10, 22 are concentric with each other, with a suitable radial spacing of about 2 mm, for example, from each other, i.e., between the inner circumferential surface of the cylindrical member 10 and the outer circumferential surface of the inner cylindrical member 22.

The inner cylindrical member 22 cooperates with the main body to divide the interior of the main body 20 into an inner cylinder chamber 24 and an outer annular space 26. Within the cylinder chamber 24, there is slidably received an electrically insulating piston 28 which is formed of a suitable resin material such that the piston 28 is movable in sliding contact with the inner circumferential surface of the inner cylindrical member 22. Thus, the cylinder chamber 24 is divided by the piston 28 into a first fluid chamber 30 and a second fluid chamber 32. The piston 28 has a sealing ring 33 on its outer circumferential surface. The sealing ring 33 improves the fluid tightness between the two chambers 30, 32.

Figure 2:
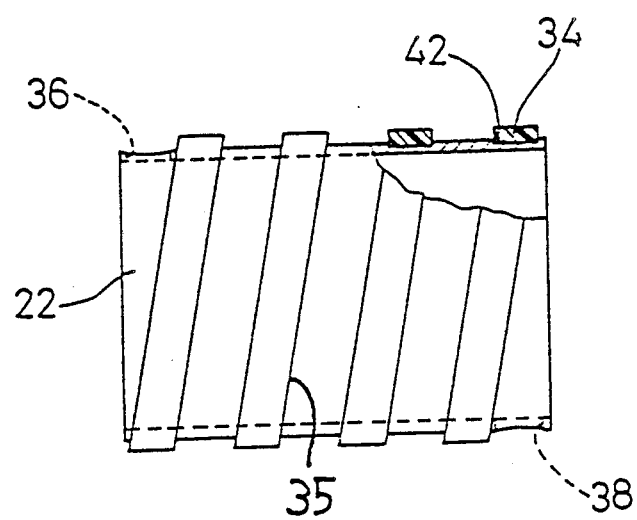
FIG. 2 is a view illustrating an inner cylindrical member of the shock absorber of FIG. 1, and a helical strip wound on the inner cylindrical member.

As illustrated in FIG. 2, an electrically insulating helical strip 34 having a suitable width is helically wound at a given pitch on the outer circumferential surface of the inner cylindrical member 22. The strip 34 is made of an electrically insulating material, which may be nylon, acrylic resin, Teflon (trade name for polytetrafluoroethylene), or any other resin, or a rubber material. The turns of the helical strip 34 are spaced apart from each other in the axial direction of the inner cylindrical member 22, so that the turns of the strip 34 cooperate with the outer circumferential surface of the inner cylindrical member 22 to define a helical groove 35 as shown in FIG. 2. This helical groove 35 is closed by the inner circumferential surface of the cylindrical member 10 of the main body 20. In other words, the helical strip 34 is disposed within the annular space 26 defined between the cylindrical portion 10 of the main body 20 and the inner cylindrical member 22, as indicated in FIG. 1, and the helical groove 35 is formed so as to helically extend within the annular space 26.

The inner cylindrical member 22 has two holes 36, 38 formed through axially opposite end portions thereof, such that the holes 36, 38, communicate with the helical groove 35, and with the respective fluid chambers 30, 32. Thus, the helical groove 35 closed by the cylindrical member 10 and the holes 36, 38 constitute a communication passage 40 having a suitable cross sectional area for fluid communication between the two fluid chambers 30, 32. The communication passage 40 and the fluid chambers 30, 32 are filled with a suitable electro-viscous or electro-rheological fluid.

The electro-viscous fluid is a fluid which is prepared by dispersing ultra-finely divided particles of silicagel or cellulose in a solvent such as kerosene or silicone oil. The electro-viscous fluid is interpreted to mean a fluid whose viscosity changes in the presence of an electric field. More precisely, the viscosity of the electro-viscous fluid increases with an increase in the magnitude of the electric field to which the fluid is exposed.

As indicated in FIG. 2, the helical strip 34 is positioned on the inner cylindrical member 22 such that a part of the thickness of the strip 34 is received in a helical groove 42 formed in the outer circumferential surface of the member 22. However, the strip 34 may be bonded to the surface of the member 22 such that the strip 34 is helically wound on the member 22. Alternatively, the strip 34 may be formed by injection molding or rubber vulcanization, such that the strip 34 is helically secured to the surface of the member 22.

To one of the opposite surfaces of the piston 28 which divides the cylinder chamber 24 into the two fluid chambers 30, 32, there is secured an operating rod 44 which slidably and fluid-tightly extends through the closure member 12 remote from the bracket 18, so that the free end portion of the rod 44 is located outside the main body 20. The free end portion has an externally threaded end 46 for connection to an engine unit of the vehicle. To the other surface of the piston 28, there is secured a balancing rod 50 which has the same diameter or cross sectional area as the operating rod 44. This balancing rod 50 slidably and fluid-tightly extends through the other closure member 14, so that the free end portion of the rod 50 protrudes into a cavity 48 formed within the cup-shaped bracket 18.

Upon application of a vibrational load between the operating rod 44 and the main body 20, the piston 28 is moved within the cylinder chamber 24, as described later, causing changes in the volumes of the two fluid chambers 30, 32 which is separated from each other by the piston 28. The balancing rod 50 is provided to assure equal amounts of volumetric changes of the two fluid chambers 30, 32 when the piston 28 is moved.

In the present embodiment, the operating rod 44 and the balancing rod 50 are constituted by a single rod, to which the piston 28 is secured. However, the operating and balancing rods 44, 50 may be separate members. The cavity 48 of the bracket 18 is open to the atmosphere through an opening (not shown) formed through the bracket 18. The cavity 48 may be an air-tightly enclosed space.

The closure members 12, 14 have respective electrically insulating rings 52, 54, which are held in contact with the opposite end faces of the inner cylindrical member 22, as shown in FIG. 1. The rings 52, 54 are made of a resin material or any other suitable electrically insulating material. The provision of these insulating rings 52, 54, together with the use of the electrically insulating materials for the helical strip 34 and piston 28, assures electrical insulation between the electrically conductive cylindrical members 10 and 22 which cooperate with the strip 34 to define the communication passage 40.

The electrically insulated two cylindrical members 10, 22 are electrically connected to a suitable power source (not shown), so that a voltage is applied between the two cylindrical members 10, 22, and consequently applied to a mass of the electro-viscous fluid contained in the communication passage 40 partially defined by the members 10, 22.

Described in detail, the cylindrical member 10 of the main body 20 is connected to the power source through a conductor directly connected to the main body 20, or through the vehicle body to which the main body 20 is secured, or through the vehicle engine. On the other hand, the inner cylindrical member 22 is connected to the power source through a conductor 56 which fluid-tightly extends through the closure member 12 on the side of the operating rod 44. It will be understood that the cylindrical member 10 of the main body 20 and the inner cylindrical member 22 serve as a pair of electrodes which are disposed opposite to each other and cooperate with the helical strip 34 to define the entire length of the communication passage 40.

Reference numeral 58 in FIG. 1 designates a seal for maintaining fluid-tightness between the conductor 56 and the closure member 12, to prevent leakage of the fluid through the hole through which the conductor 56 extends into the fluid chamber 30.

Usually, the shock absorber constructed as described above is installed on the vehicle such that the fixing bolt 16 of the main body 20 is secured to the vehicle body, while the operating rod 44 is secured at its threaded end 46 to the engine unit of the vehicle, so that a vibrational load is applied between the main body 20 and the operating rod 44. In the installed condition of the shock absorber, the piston 28 is generally positioned at the axially middle position of the cylinder chamber 24 while no vibrational load is applied to the shock absorber. This arrangement allows the piston 28 to be moved in opposite directions on the sides of the operating and balancing rods 44, 50.

When a vibrational load is applied between the main body 20 and the operating rod 44 of the thus installed shock absorber, the piston 28 is moved within the cylinder chamber 24, causing the electro-viscous fluid to flow between the two fluid chambers 30, 32 through communication passage 40. As a result, there arise pressure changes in the two chambers 30, 32, based on the resistance to the flows of the fluid through the communication passage 40. The pressure changes in the fluid chambers 30, 32 act to prevent movements of the piston 28, i.e., relative movements of the operating rod 44 and the main body 20, thereby preventing vibrational displacement of the engine unit with respect to the vehicle body. Namely, a damping force is produced by the pressure changes in the two fluid chambers 30, 32 which are caused by the mass of the electro-viscous fluid which flows through the communication passage 40 with a certain value of flow resistance. Thus, the vibrational load applied between the main body 20 and the operating rod 44 is damped, whereby the oscillation or shake of the engine unit relative to the vehicle body is reduced or damped.

While no voltage or a relatively low voltage is applied between the two electrodes, that is, between the cylindrical members 10, 22 which are opposite to each other to partially define the communication passage 40, the viscosity (nominal or apparent value) of the electro-viscous fluid existing in the communication passage 40 is relatively low. In this condition, therefore, the damping force produced based on the flow resistance of the fluid, and the braking force acting to prevent relative movements between the operating rod 44 and the main body 20 are accordingly relatively small. When a voltage is applied between the two electrodes, or when the applied voltage level is increased, the viscosity of the electro-viscous fluid increases to a substantially effective extent, resulting in a considerable increase in the resistance to the flows of the fluid through the communication passage 40. Consequently, the damping force produced based on the fluid flow resistance, and the braking force to prevent the relative movements of the rod 44 and main body 20 are accordingly increased to a considerable extent.

In view of the above facts, a suitable voltage is applied between the cylindrical members 10, 22 when the vehicle is rapidly or abruptly started or braked, or turning a sharp corner or running on a bumpy road surface, and no voltage is applied or the applied voltage level is lowered when the engine is idling or the vehicle is normally running. Therefore, by electrically controlling the present shock absorber as described above, the shock absorber effectively damps the engine shake or prevents an excessive amount of oscillation of the engine, upon rapid or abrupt starting, sharp turning or bumpy-road running of the vehicle. Further, the vibrations which are generated during the engine idling or normal running of the vehicle may be effectively isolated by vibration-isolating elastic mounts such as rubber mounts, which are used in combination with the present shock absorber, for preventing vibrations to be transmitted from the engine to the vehicle body. Thus, the present shock absorber effectively avoids deterioration of the driving stability and comfort during rapid or abrupt starting or braking, sharp turning or bumpy-road running of the vehicle, while at the same time assuring an excellent driving comfort of the vehicle during the engine idling or normal vehicle running.

It will be understood from the foregoing description that the present shock absorber is capable of selectively changing the condition of mounting of the engine relative to the vehicle body, by simply controlling the voltage applied between the cylindrical members 10, 22 (electrodes disposed opposite to each other so as to partially define the communication passage 40), depending upon the vehicle condition (vehicle running condition, in particular). Further, the present shock absorber is simpler in construction than the conventional counterpart, since the present absorber does not use a complicated mechanism for changing the shape or dimensions of the communication passage 40 to adjust the engine mounting condition.

Figure 3:
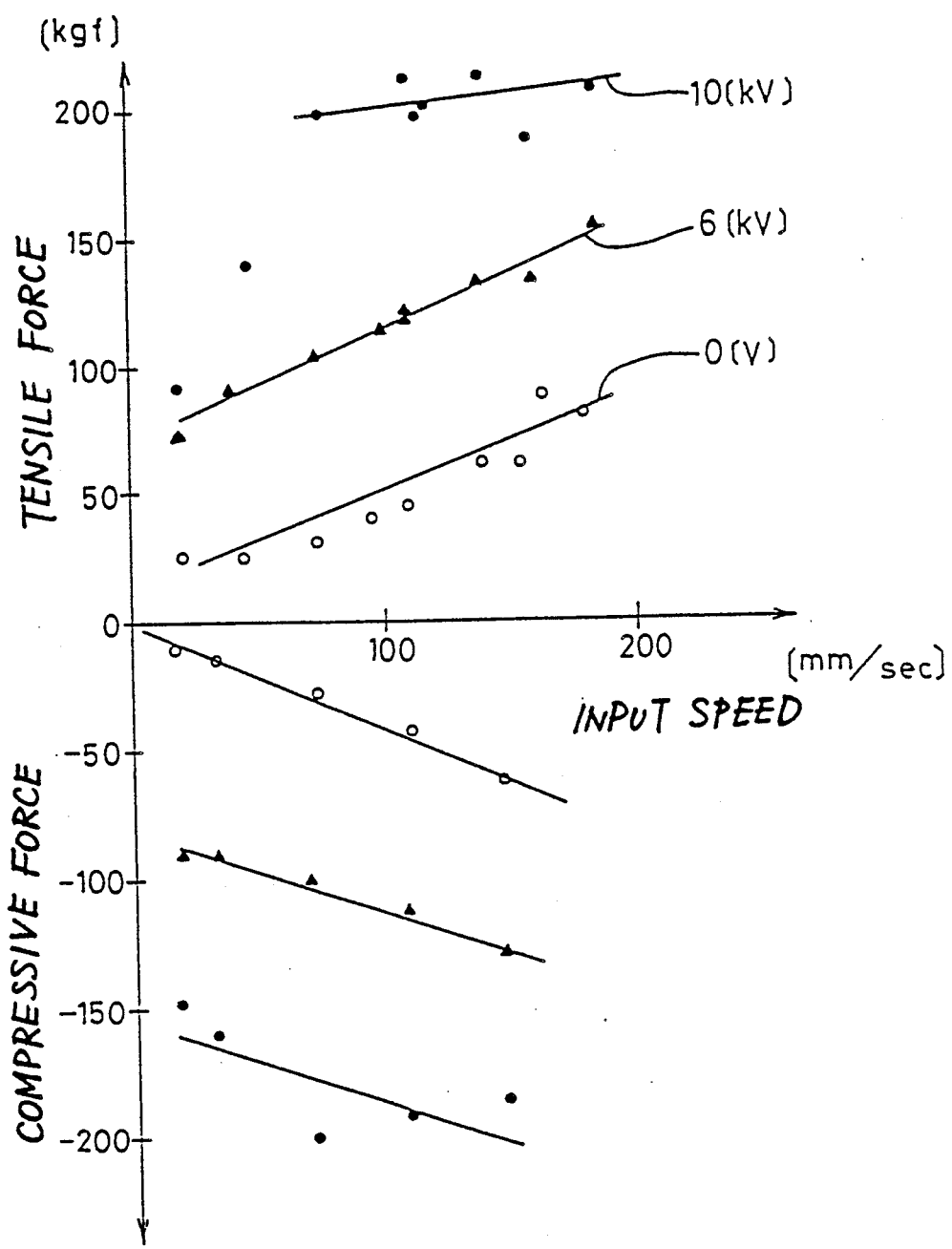
FIG. 3 is a graph indicating damping characteristics of the shock absorber of FIG. 1 exhibited in a test.

FIG. 3 shows damping characteristics of the present shock absorber constructed as described above, which were obtained in a test when the voltage applied between the cylindrical members 10, 22 was 0 V, 6 kV, and 10 kV. The graph of FIG. 6 indicates that the mounting condition of the engine or the vibration-damping condition of the shock absorber can be suitably adjusted by changing the voltage applied to the cylindrical members 10, 22 depending upon the condition of the vehicle.

In the embodiment described above, the helical strip 34 is wound on the outer circumferential surface of the inner cylindrical member 22 so as to provide the helical communication passage 40 for fluid communication between the two fluid chambers 30, 32. However, an electrically insulating strip other than the helical strip 34 may be used to form a communication passage for the same purpose. The annular space 26 may be used as a communication passage, if the space 26 meets the required damping characteristics of the shock absorber.

Both of the cylindrical member 10 of the main body 20 and the inner cylindrical member 22 in the above embodiment are entirely made of a metallic material to serve as a pair of electrodes which are disposed opposite to each other so as to partially define the communication passage 40. However, the entire portions of the cylindrical members 10, 22 need not serve as the electrodes, and the principle of the present invention may be practiced with changes or modifications in the form and location of the electrodes, provided that at least a portion of the communication passage 40 is partially defined by the appropriate portions of the cylindrical members 10, 22. In other words, the shock absorber requires at least one pair of electrodes one of which consists of at least a portion of the cylindrical member 10 partially defining a portion of the communication passage, and the other of which consists of at least a portion of the cylindrical member 22 partially defining the above portion of the communication passage 40.

Figure 4:
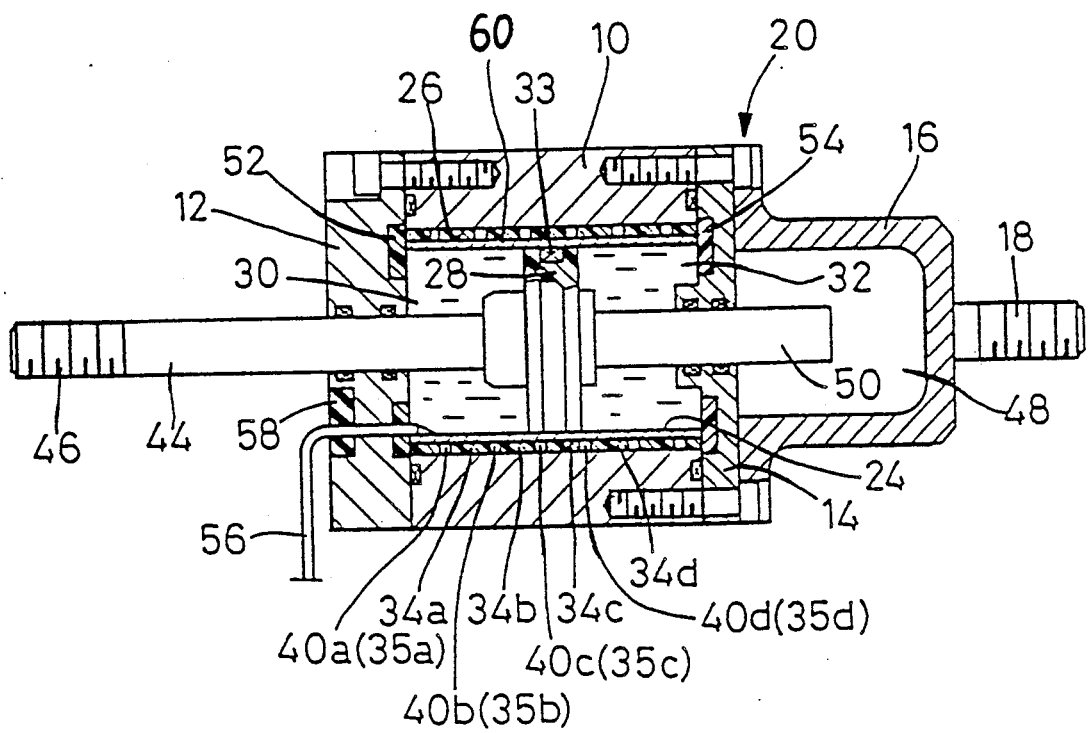
FIG. 4 is a view corresponding to that of FIG. 1, showing another embodiment of the present invention.
Figure 5:
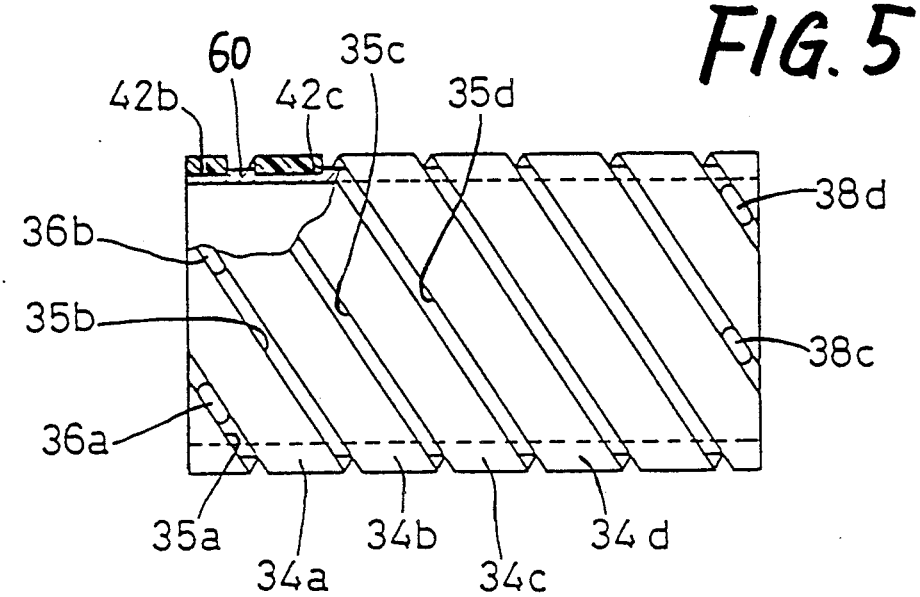
FIG. 5 is a view corresponding to that of FIG. 2, illustrating an inner cylindrical member and four helical strips used in the embodiment of FIG. 4.
Figure 6:
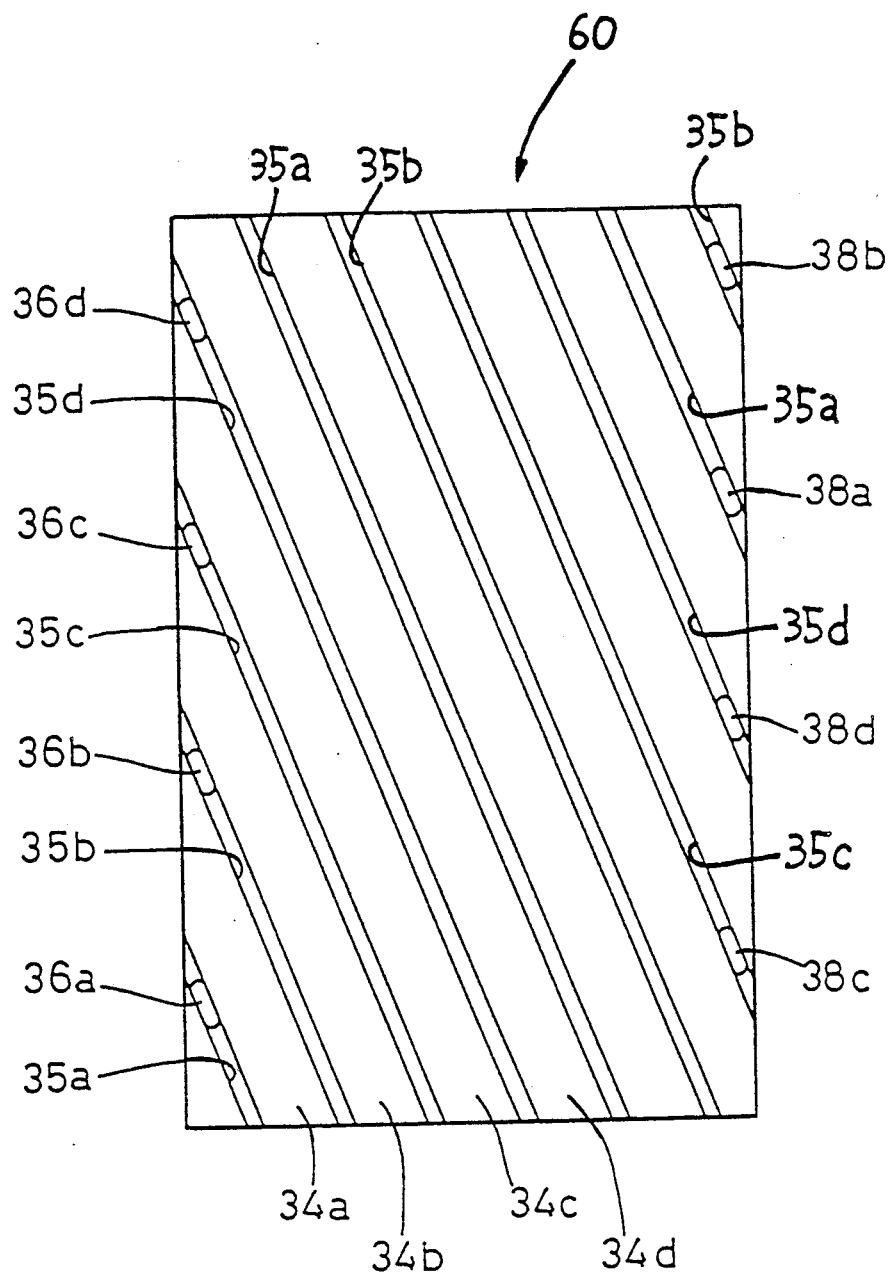
FIG. 6 is an illustration the development of the helical strips on the outer surface of the inner cylindrical member of FIG. 5.

Referring next to FIGS. 4–6, another embodiment of the present invention will be described. This embodiment is different from the preceding embodiment, only in connection with the arrangement for defining a communication passage for fluid communication between the two fluid chambers 30, 32. In the interest of brevity and simplification, the same reference numerals as used in FIG. 1 will be used in this modified embodiment, to identify the same components, which will not be described.

In this second embodiment, an inner cylindrical member 60 as shown in FIGS. 4–6 is used in place of the inner cylindrical member 22 of the preceding embodiment. The inner cylindrical member 60 has four helical grooves formed in the outer circumferential surface, as indicated at 42b and 42c in FIG. 2 by way of example. These four helical grooves are helically formed at the same pitch. In the helical grooves, there are partially accommodated respective four electrically insulating helical strips 34a, 34b, 34c and 34d such that the four strips 34a–34d are wound on the inner cylindrical member 60 at the same pitch. As shown in FIGS. 5 and 6, the turns of adjacent ones of the strips 34a–34d cooperate with the outer circumferential surface of the inner cylindrical member 60 to define four helical grooves 35a–35d, which are fluid-tightly closed by the inner circumferential surface of the cylindrical member 10 of the main body 20, as indicated in FIG. 4.

The inner cylindrical member 60 has eight holes 36a–36d and 38a–38d formed therethrough, so that each of the four helical grooves 35a–35d passing through the annular space 24 communicates with the two fluid chambers 30, 32 through the appropriate pair of holes 36a–38a, 36b–38b, 36c–38c, 36d–38d, as indicated in FIG. 4. The pair of holes 36a and 38a, for example, communicate both with the helical groove 35a, and with the respective two fluid chambers 30, 32. Thus, the four helical strips 34a–34d cooperate with the cylindrical members 10 and 60 to define a communication passage in the form of four helical parallel lines 40a–40d which have the same length and the same cross sectional area, for fluid communication between the two fluid chambers 30, 32.

In the present embodiment, the communication passage for fluid communication between the two fluid chambers 30, 32 consists of the four helical parallel lines 40a–40d for fluid communication between the two fluid chambers 30, 32.

As in the preceding embodiment, the inner cylindrical member 60 and the cylindrical member 10 of the main body 10 are electrically connected to the suitable power source, so that these members 60 and 10 serve as a pair of electrodes which are disposed opposite to each other so as to partially define the four parallel lines 40a–40d, for applying a voltage to the masses of the fluid in these parallel lines.

Like the communication passage 40 used in the preceding embodiment, each of the four parallel lines 40a–40d is helically formed so that the length of each passage line is relatively long to provide a relatively high vibration damping effect for a given voltage applied to the electrodes in the form of the cylindrical members 10, 60. Further, the provision of the four parallel lines 40a–40d as the communication passage for fluid communication between the two fluid chambers 30, 32 results in producing a larger vibration damping effect for a given voltage applied to the electrodes 10, 60, than in the case where the shock absorber uses a single passage line which has the cross sectional area equal to the total cross sectional area of the four parallel lines 40a–40d and which has the same length as the parallel lines 40a–40d. In other words, a given vibration damping force (braking force preventing relative movements between the rod 44 and the main body 20) is obtained in the present embodiment, with a lower voltage applied to the electrodes and with a small amount of electric power, than in the case where the above-indicated single passage line is provided. Accordingly, the present arrangement makes it possible to reduce the required amount of electric power or the load on the power source, for obtaining the desired damping effect, whereby the power source is suitably protected against overloading which would otherwise occur due to the excessively increased amount of electric power upon excessive rise of the temperature of the electro-viscous fluid.

The present shock absorber provides an increased damping effect, since the total area of the surfaces which define the four parallel lines 40a–40d and contacts the electro-viscous fluid is considerably larger than the corresponding surface area of a single passage line which has the same length as that of the four parallel lines 40a–40d and which has the same cross sectional area as the total cross sectional area of the four parallel lines 40a–40d. As a result, the frictional resistance of the fluid masses with respect to the contact surfaces of the four parallel lines 40a–40d of the present shock absorber is larger than that of the single passage line, by the amount equal to the difference in the contact surface area between the four parallel lines and the single passage line. Accordingly, the total fluid flow resistance is increased in the present embodiment.

Table 1 indicates calculated length ratios of a single passage line, two parallel lines (passage lines), and three parallel lines (passage lines), which are used as the communication passage communicating with the two chambers 30, 32 to obtain the same vibration damping effect (braking force), where the distance between the electrodes, the total cross sectional area, and the voltage applied to the electrodes are the same in these three cases. It will be understood from the table that the required length of the parallel lines, and the amount of current consumed by the fluid decrease with an increase in the number of the parallel lines. Although the values indicated in the table are obtained by calculation, experiments confirmed a tendency similar to that indicated in the table.

TABLE 1

| Number of Passages | 1 | 2 | 3 |
|---|---|---|---|
| Passage Length Ratio | 1 | 0.91 | 0.46 |

In the modified embodiment of FIGS. 4–6, the four parallel lines 40a–40d extend over the entire length of the communication passage between the two fluid chambers 30, 32. However, the principle of the present invention may be practiced if only a portion of the entire length of the communication passage may consist of a plurality of parallel lines.

The cylindrical members 10, 60 disposed opposite to each other so as to partially define the parallel lines 40a–40d in the above embodiment need not be entirely made of a metallic material to serve as the electrodes. Namely, the principle of the present invention requires that at least a portion of each of the parallel lines 40a–40d be partially defined by the appropriate electrically conductive electrodes one of which consists of at least a portion of the cylindrical member 10 of the main body 20, and the other of which consists of at least a portion of the inner cylindrical member 60, irrespective of the form, location and number of the electrodes.

While the illustrated embodiments are adapted to serve as the shock absorber for damping oscillation of the engine of an automotive vehicle, the principle of the present invention is applicable to any shock absorbers for various other purposes.

What is claimed is:

1. A shock absorber comprising:
 a main body including a cylindrical portion having opposite open ends, and closure wall portions fluid-tightly closing the open ends of the cylindrical portion;
 an inner cylindrical member disposed within said main body, with a predetermined radial spacing from an inner circumferential surface of said cylindrical portion, and cooperating with said main body to define an inner cylinder chamber and an outer annular space;

a psiton slidably received within said inner cylinder chamber, so as to divide the cylinder chamber into two fluid chambers;

means for defining a communication passage for fluid communication between said two fluid chambers, said means including a portion formed within said annular space;

an electro-viscous fluid filling said two chambers and said communication passage;

an operating rod secured to said piston and slidably and fluid-tightly extending through one of said two closure wall portions of said main body;

a balancing rod secured to said piston and slidably and fluid-tightly extending through the other of said two closure wall portions, said operating and balancing rods having a same cross sectional area; and at least one pair of electrodes one of which consists of at least a portion of said cylindrical portion of said main body and the other of which consists of at least a portion of said inner cylindrical portion, the electrodes of each of said at least one pair being disposed opposite to each other, so as to define at least a portion of said communication passage, for applying a voltage to a mass of said electro-viscous fluid in said portion of said communication passage and wherein said means for defining at least one communication passage comprises an electrically insulating strip wound on an outer circumferential surface of said inner cylindrical member such that turns of said strip are spaced apart from each other in an axial direction of said inner cylindrical member, said turns of said strip cooperating with said outer circumferential surface of said inner cylindrical member to define a groove which is closed by said inner circumferential surface of said cylindrical portion of said main body, whereby a portion of a single communication passage as said communication passage is formed within said annular space.

2. A shock absorber according to claim 1, wherein said electrically insulating strip consists of a helical strip helically wound on said inner cylindrical member so as to define a helical groove as said groove.

3. A shock absorber according to claim 1, wherein said means for defining communication passage comprises a portion of said inner cylindrical member which has holes for fluid communication of said portion of said single communication passage with said two fluid chambers.

4. A shock absorber according to claim 1, wherein said at least one pair of electrodes consist of a first electrode consisting of said cylindrical portion of said main body, and a second electrode consisting of said inner cylindrical member, said first and second electrodes cooperating with said electrically insulating strip to define a substantially entire length of said single communication passage.

5. A shock absorber according to claim 1, wherein at least a portion of said communication passage consists of a plurality of parallel lines, said at least one pair of electrodes defining at least a portion of each of said parallel lines.

6. A shock absorber according to claim 5, wherein said means for defining communication passage comprises a plurality of electrically insulating strips wound on an outer circumferential surface of said inner cylindrical member such that turns of each of said strips are spaced apart from each other in an axial direction of said inner cylindrical member, the turns of adjacent ones of said strips cooperating with said outer circumferential surface of said inner cylindrical member to define a plurality of grooves which are closed by said inner circumferential surface of said cylindrical portion of said main body, whereby portions of a plurality of parallel lines as said communication passage are formed within said annular space.

7. A shock absorber according to claim 6, wherein said electrically insulating strips consist of a plurality of helical strips helically wound on said inner cylindrical member so as to define a plurality of helical grooves as said grooves.

8. A shock absorber according to claim 6, wherein said means for defining communication passage comprises a portion of said inner cylindrical member which has holes for fluid communication of said plurality of parallel lines with said two fluid chambers.

9. A shock absorber according to claim 6, wherein said at least one pair of electrodes consist of a first electrode consisting of said cylindrical portion of said main body, and a second electrode consisting of said inner cylindrical member, said first and second electrodes cooperating with said electrically insulating strips to define a substantially entire length of said plurality of parallel lines.

10. A shock absorber according to claim 9, wherein said portions of said plurality of parallel lines within said annular space communicate with said two fluid chambers through holes which are formed through said inner cylindrical member.

11. A shock absorber according to claim 9, wherein said operating rod is connected to one of a body and an engine unit of an automotive vehicle, while said main body is connected to the other of said body and said engine unit of the vehicle.

12. A shock absorber according to claim 1, wherein said operating rod and said balancing rod consist of a single rod.

* * * * *